United States Patent Office 3,324,738
Patented June 13, 1967

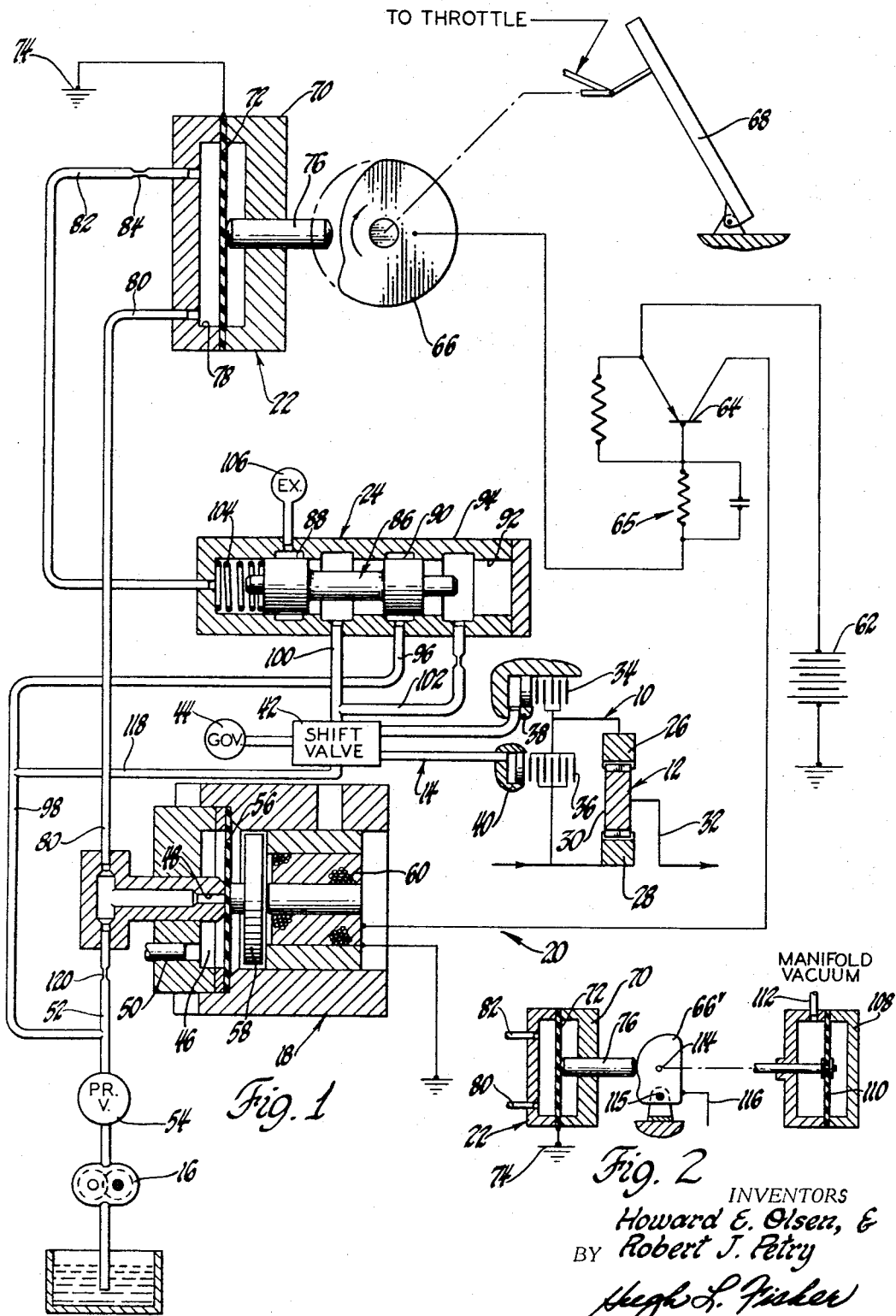

3,324,738
CONTROL SYSTEM
Howard E. Olsen, Plymouth, and Robert J. Petry, Berkley, Mich., assignors to General Motors Corporation, Detroit, Mich., a corporation of Delaware
Filed Dec. 21, 1964, Ser. No. 420,014
11 Claims. (Cl. 74—472)

This invention relates to improvements in control systems adapted, although not exclusively, for use with automatic vehicle transmissions.

An automatic vehicle transmission must be informed of driver demands so that the appropriate drive ratio can be provided. For example, if the driver requires maximum acceleration, the transmission should change to the ratio affording this. Customarialy, this driver demand is transferred to the transmission by mechanical linkage. This linkage, of course, can be connected to a source reflecting driver demand in various ways; e.g., by connecting the linkage to the throttle or the accelerator pedal or to a transducer that responds to the pressure variations within the intake manifold. As can be appreciated, such mechanical linkage is both extensive and complicated and, therefore, subject not only to wear but also to misalignments. On the other hand, electrical or hydraulic equivalents are influenced by temperature and pressure variations due to environmental influences. Moreover, large valve displacements, which are usually required by a fluid pressure operated transmission, are not easily obtained electrically.

A novel control is therefore proposed that electrohydraulically develops a reference pressure based upon a mechanically derived signal reflecting the position of a controller.

Further proposed is a control system that is electrohydraulically operated in accordance with mechanically derived information reflecting driver demand on a vehicle engine.

Also contemplated is a transmission control system that mechanically derives information about driver demand and converts this information into electric impulses that are utilized to control a pressure varying valve. The pressure varying valve develops a corresponding reference pressure that is employed both for feedback purposes and for operating the transmission.

The foregoing and other objects and advantages of the invention will become apparent from the following description and the accompanying drawing, in which:

FIGURE 1 illustrates schematically a control system that incorporates the principles of the invention; and FIGURE 2 shows schematically a modification of a sensor for the FIGURE 1 system.

Referring now to the drawing in detail, and initially to FIGURE 1, the numeral 10 denotes generally a transmission including gearing 12 and fluid pressure operated ratio changing mechanism 14. The fluid pressure for the mechanism 14 is derived from a pump 16 appropriately driven by the transmission and is supplied thereto in accordance with driver demand. This fluid pressure is modified to reflect driver demand by an electrically operated valve, viewed generally at 18. An energizing circuit 20 controlled by a driver demand or throttle position sensor 22 operates the valve 18 so as to develop, in a way to be explained, a reference fluid pressure reflecting throttle position and accordingly driver demand. This reference pressure is in turn employed to operate a pressure regulating valve 24, which controls the supply of pressure fluid to the mechanism 14.

Considering first the transmission 10, the gearing 12, for illustration purposes, is depicted as the planetary type and includes a ring gear 26, a sun gear 28, one or more planet pinions 30 intermeshing with the ring and sun gears 26 and 28, and a planet carrier 32 for revolvably supporting the planet pinions 30. Although only a single planetary gear unit is shown, it is, of course, to be understood that additional gear units compounded in any desired way may be used to obtain more drive ratios. The gearing 12 has the sun gear 28 serving as the input and the carrier 32 as the output. The sun gear 28 can be connected in any well known way to the vehicle engine through the intermediary of a clutch (not shown), which can be a torque converter or a fluid coupling, while the carrier 32 can be drive connected to the vehicle rear wheels through the usual rear axle gearing.

The ratio changing mechanism 14 includes a brake 34 and a clutch 36 respectively engaged by fluid pressure operated motors 38 and 40. A conventional shift valve 42 that is positioned in accordance with driver demand and vehicle speed determines which of the motors 38 and 40 is to be supplied with fluid pressure from the pump 16 and when. Any suitable governor 44, such as that disclosed in the United States Patent No. 2,204,872 to Thompson, driven at a speed proportional to the speed of the carrier 32 can be used to provide the speed responsive effect, whereas the pressure regulating valve 24 provides the driver demand effect, as will be explained further. In operation, when the brake 34 is engaged the ring gear 26 is prevented from rotating backwardly and, hence, the carrier 32 is driven forwardly at a slower speed than the sun gear 28. When the clutch 36 is engaged, the ring and sun gears 26 and 28 are joined together so that the gearing 12 rotates as a unit and the sun gear 28 and the carrier 32 have the same sense and speed of rotation.

The electrically operated valve 18 includes a control chamber 46 having a restricted inlet 48 and an exhaust 50. The restricted inlet 48 communicates with an outlet 52 from the pump 16 and, therefore, has supplied thereto a fluid having a pressure determined by a suitable pressure regulating valve 54 situated in this outlet 52. The communication between the restricted inlet 48 and the exhaust 50 is controlled by a flexible diaphragm 56. The flexible diaphragm 56 has an armature 58 attached thereto and thus is either in an open or closed position with respect to the restricted inlet 48 as determined by the energization of a solenoid winding 60. When the solenoid winding 60 is energized, the armature 58 is attracted to the right and, accordingly, the flexible diaphragm 56 so that communication is permitted between the restricted inlet 48 and the exhaust 50. This decreases the pressure of the fluid, i.e., the reference pressure, supplied to an inlet 80. On the other hand, when the solenoid winding 60 is deenergized the attractive force acting on the armature 58 is removed and the flexible diaphragm 56 due to its built-in bias will return to the normal closed position shown and the reference pressure will increase.

The energizing circuit 20 which supplies current to the solenoid winding 60 includes a power source, such as a vehicle battery 62, and a switching device, such as a PNP junction transistor 64. The transistor 64 has the emitter and the collector electrodes respectively connected to the battery 62 and the solenoid winding 60. The base electrode is connected to the throttle position sensor 22. When the base electrode of the transistor 64 is grounded, a biasing network 65 will cause the transistor 64 to become conductive and current will be supplied therethrough to the solenoid winding 60.

The throttle position sensor 22 includes a revolvable cam 66 that is drive connected to an accelerator pedal, shown at 68, so as to be rotated thereby and have a position corresponding to the throttle opening. The cam 66 is connected to the base electrode of the transistor 64 and hence is suitably insulated from its mounting. The throttle position sensor 22 also includes a pressure switch 70 having a flexible diaphragm 72 formed of a conductive material and grounded at 74. The flexible diaphragm 72 is both responsive to the position of the cam 66 throuugh the intermediary of a drive pin 76 and the reference pressure developed by the electrically operated valve 18. This latter is accomplished by a chamber 78 formed on the side of the flexible diaphragm 72 opposite the drive pin 76. The control chamber 78 has the inlet 80 communicating with an outlet 82 from the valve 18. The outlet 82 includes a dampening orifice 84 and extends to the pressure regulating valve 24. Thus, the control chamber 78 contains the reference pressure developed by the electrically operated valve 18 and provides a feedback to the throttle position sensor 22 for advising the sensor 22 of the pressure actually being developed at each throttle position. In the absence of any force acting thereon, the diaphragm 72 will assume the illustrated position because of its flexibility and the restoring bias resulting therefrom.

Considering next the structure of the pressure regulating valve 24, a spool type valve element 86 having spaced lands 88 and 90 is employed. The valve element 86 is slidable within a bore 92 in a valve body 94. The valve body 94 has an inlet 96 communicating with a branch 98 of the pump outlet 52 and an outlet 100 communicating with the shift valve 42. A branch 102 of the outlet 100 extends to the right end of the valve element 86 while the right end of the valve element 86 communicates with the outlet 82 from the control chamber 78 of the pressure switch 70. A spring 104 positioned within the left end of the bore 92 urges the valve element 86 to the right.

In operation the valve element 86 will initially be in a position where fluid under pressure in the inlet 96 is transferred around the land 90 and to the outlet 100. This fluid pressure proceeds via the branch 102 to the right end of the valve element 86 and urges it to the left against the opposing bias both from the spring 104 and from the reference pressure in the outlet 82 of the pressure switch 70. The valve 24 is so calibrated that in the absence of the reference pressure the valve element 86 would provide a minimum regulated pressure in the outlet 100 and hence would move leftwardly to a position in which the land 88 permits communication with an exhaust port 106. Consequently, the valve element 86 will move back and forth in the usual way between the exhaust port 106 and the inlet 96 to develop the minimum pressure. As the reference pressure increases, of course, the regulating valve 24 will develop a correspondingly increased pressure in proportion to the increases in the reference pressure. This pressure in the outlet 100 thus reflects throttle position and therefore driver demand and will oppose the speed responsive force developed by the governor 44. Both forces, in acting in opposition and on the shift valve 42, will cause it to assume a corresponding position and consequently the transmission 10 to be conditioned for the drive ratio that will provide the acceleration demanded.

The pressure switch 70 has been described as employing an accelerator pedal operated cam 66 so as to reflect driver demand. An alternative construction is shown in FIGURE 2 where a motor 108 is employed. This motor 108 incorporates a flexible diaphragm 110 that is connected to a cam 66' and that is exposed to intake manifold pressure via a conduit 112. Therefore, as the pressure within the intake manifold decreases, i.e., becomes more negative to indicate a decreased load, the diaphragm 110 will rotate the cam 66' due to the connection thereto at 114 and the pivotal support of the cam 66' at 115 so as to urge the drive pin 76 to the left; whereas when the intake manifold pressure increases, the cam 66' will turn in the other direction so that the reference pressure will increase. The cam 66, of course, is connected to the base electrode of the transistor 64 by a lead 116 and necessarily would be insulated from the surrounding parts.

Summarizing the operation, it will be assumed that the vehicle is proceeding in its reduced speed ratio in which the shift valve 42 will be in its downshifted position, connecting the brake 38 to the outlet 52 from the pump 16 via branches 98 and 118. Consequently, the brake 34 is engaged to hold the ring gear 26 and provide reaction for the gearing 12. If it is assumed that the accelerator pedal 68 is in the closed throttle position, the cam 66 will be in a corresponding position and the pressure within the chamber 78 will be substantially the same as that in the outlet 52 from the pump 16. Hence, the flexible diaphragm 72 will be urged rightwardly and push the drive pin 76 into engagement with the cam 66. This will ground the base electrode for the transistor 64 and cause the transistor 64 to conduct. The resultant current flow will energize the solenoid winding 60 and then render the electrically operated valve 18 effective to reduce the pressure in the chamber 78. Full communication, therefore, is permitted between the restricted inlet 48 and the exhaust 50. The pressure of the fluid in the pressure switch control chamber 78 is immediately reduced, this being further facilitated by an orifice 120 upstream from the restricted inlet 48. The size of the orifice 120 is selected so as to afford the desired response. For instance, a smaller orifice will cause the pressure to drop faster. As soon as the pressure of the fluid within the control chamber 78 reduces, the flexible diaphragm 72 will return to the illustrated normal position in which the drive pin 76 will no longer engage the cam 66. Therefore, the ground connection of the transistor base electrode will be interrupted and the transistor 64 will cease conducting. As a consequence, the solenoid winding 60 is deenergized and the electrically operated valve 18 assumes the demonstrated position. The pressure of the fluid within the control chamber 78 is now allowed to build up until the drive pin 76 is again urged against the cam 66. This cycle continuously repeats itself and the reference pressure developed by the electrically operated valve 18 will exactly correspond to the position of the accelerator pedal 68 as determined by the contour of the cam 66. This cam contour can be modified to vary this reference pressure, i.e., both its rate of change and magnitude.

As can be appreciated the pressure switch 70 responds both to accelerator position or throttle position, and to the reference pressure. The reference pressure advises the pressure device 70 of the pressure being developed at a certain throttle position and thus provides a feedback. Of course, without this feedback the throttle position sensor 22 would not know what pressure was being developed and, hence, would assume some position corresponding to that of the throttle, which position could or could not cause the desired reference pressure at that throttle position to be developed.

The reference pressure developed at this minimum throttle opening is supplied via the outlet 82 from the control chamber 78 to the pressure regulating valve 24. The valve 24 will therefore develop a minimum pressure in the outlet 100 to the shift valve 42.

As the accelerator pedal 68 is depressed further so as to increase the throttle opening, the cam 66 will be rotated in the direction of the arrow, i.e., clockwise, to provide an increased distance between the surface of the cam 66 and the flexible diaphragm 72. Consequently, the reference pressure within the control chamber 78 is allowed to correspondingly increase and in effect cause the time interval during which the drive pin 76 is in contact with the cam 66 to be decreased and, accordingly, the on-time of the transistor 64. This decrease in on-time causes the electrically operated valve 18 to be closed for corresponding longer time intervals such that the reference pressure can progressively increase to some desired maximum. Hence, the reference pressure will increase at a rate determined both by how fast the throttle is opened and the contour of the cam 66.

If subsequently the accelerator pedal 68 is moved to its full throttle position, the reference pressure will increase to its maximum value and cause the pressure regulating valve 24 to correspondingly develop its maximum pressure. This maximum pressure acting upon the shift valve 42 will prevent an upshift until the force generated by the governor 44 is adequate to overcome this. If the shift valve 42 would normally move to its upshifted position with a minimum throttle opening at 15 miles per hour, this upshift could conceivably be delayed until perhaps 30 miles per hour. When this upshift occurs, the brake 34, as mentioned, is disengaged and the clutch 36 engaged.

As can now be appreciated, the throttle position sensor 22 affords a mechanical reference and thus is not sensitive to temperature and pressure variations due to environmental effects. Hence, no compensation is needed. However, this mechanical reference provided by the sensor 22 is derived with a minimum of mechanical parts so that wear and misalignments are not a problem. Additionally, the cam 66 is easily replaced with other cams having a different configuration so that various reference pressure curves can be obtained with a minimum modification of the basic system. For example, if it is desired that the reference pressure increase rapidly as throttle opening takes place and then to increase at a slower rate, a correspondingly shaped cam 66 is provided. Then too, if the reference pressure is to increase linearly with increased throttle opening, this is also easily accomplished by the appropriate modifications of the cam 66. Also, as will be appreciated, the actuation of the pressure regulating valve 24 is done hydraulically so that the extent of displacement of the valve element 86 presents no problem.

Also, it should be realized that the reference pressure may in some applications be used directly to operate the shift valve 42 or something similar. This would negate the need for the pressure regulating valve 24. However, where large quantities of pressure fluid are required, the direct use of the reference pressure fluid would be precluded and it would have to be used as in FIGURE 1; i.e., as a control signal.

The invention is to be limited only by the following claims.

What is claimed is:

1. In combination; a movable controller; a pressure fluid source; and means developing a reference pressure corresponding to the position of the movable controller; the developing means including an electrically operated valve, an energizing circuit for operating the valve, the energizing circuit including an electric power source and switching means operative to connect the valve to the power source, means sensing the position of the movable controller and also responsive to fluid pressure for operating the switching means, and feedback means supplying the reference pressure to the sensing means so that the sensing means responds to the reference pressure.

2. In combination; a movable controller; a pressure fluid source; and means developing a reference pressure corresponding to the position of the movable controller; the developing means including an electrically operated valve, an energizing circuit for operating the valve, the energizing circuit including an electric power source and a switching device operative to connect the valve to the power source, means sensing the position of the movable controller for operating the switching device in accordance with the position thereof, the sensing means including a cam surface associated with the movable controller so as to have corresponding movements and a switch actuated by the cam surface for operating the switching device; and feedback means supplying the reference pressure to the switch so as to render the switch responsive to the reference pressure in addition to the position of the cam surface.

3. In combination; a movable controller; a fluid pressure source; and means developing a reference pressure corresponding to the position of the movable controller; the developing means including an electrically operated valve, an energizing circuit for operating the valve, the energizing circuit including an electric power source and a switching transistor having emitter and collector electrodes so arranged as to interconnect the power source and the valve and a control electrode, means sensing the position of the movable controller for operating the transistor in accordance with the position thereof, the sensing means including a cam surface associated with the movable controller so as to have corresponding movement and a pressure switch actuated by the cam surface, the switch being adapted to cause a bias to be applied to the control electrode for operating the transistor, and feedback means supplying the reference pressure to the switch so as to render the switch responsive to the reference pressure in addition to position of the cam surface.

4. In a control to be associated with a movable engine controller; the combination of a pressure fluid source; and means developing a reference pressure corresponding to the position of the movable engine controller; the developing means including an electrically operated valve, an energizing circuit for operating the valve, the energizing circuit including an electric power source and a switching device operative to connect the valve to the power source, means sensing the position of the movable engine controller and also responsive to fluid pressure for operating the switching device in accordance both with the fluid pressure and the position of the movable engine controller, and feedback means supplying the reference fluid pressure to the sensing means so that the sensing means responds to the reference fluid pressure.

5. In a control to be associated with a throttle controlled engine; the combination of a fluid pressure source; means developing a reference pressure corresponding to throttle position; the developing means including an electrically operated valve, an energizing circuit for operating the valve, the energizing circuit including a power source and a switching device operative to connect the valve to the power source, means sensing the throttle position for operating the switching device in accordance with the position thereof, the sensing means including a cam surface associated with the throttle so as to have corresponding movements and a pressure switch actuated by the cam surface for operating the switching device, and feedback means supplying the reference pressure to the pressure switch so as to render the pressure switch responsive to the reference pressure in addition to the position of the cam surface.

6. In a control system; the combination of a movable controller; a pressure fluid source; means developing a reference fluid pressure corresponding to the position of the movable controller, the developing means including an electrically operated valve, an energizing circuit for operating the valve, the energizing circuit including a power source and switching means for connecting the valve to the power source, means sensing the position of the movable controller and also responsive to fluid pressure for operating the switching means in accordance therewith, and feedback means supplying the reference pressure to the switching means so as to render the switching means both responsive to the reference pressure and the position of the movable controller; and means communicating with the pressure fluid source and operative in response to the reference pressure to develop therefrom an output pressure reflecting variations in the reference pressure.

7. In a control system for an engine driven transmission having ratio changing mechanism for varying the drive through the transmission; the combination of movable means responsive to driver demand on the engine; a pressure fluid source; means developing a reference pressure corresponding to the position of the movable means; the developing means including an electrically operated valve, means sensing the position of the movable means for operating the valve, and feedback means supplying the reference pressure to the sensing means so as to render the sensing means responsive to the reference pressure in addition to the position of the movable means; and means communicating with the pressure fluid source and operative in response to the reference pressure to develop therefrom a pressure reflecting driver demand for controlling the ratio changing mechanism.

8. In a control system for an engine driven transmission having ratio changing mechanism for varying the drive through the transmission; the combination of movable means responsive to driver demand on the engine; a pressure fluid source; means developing a reference fluid pressure corresponding to the position of the movable means; the developing means including an electrically operated valve communicating with the source and operative to develop the reference fluid pressure, an energizing circuit for operating the valve, the energizing circuit including an electric power source and switching means operative to connect the valve to the power source, means sensing the position of the movable means for operating the switching means; and feedback means supplying the reference fluid pressure to the sensing means so as to render the sensing means also responsive to the reference fluid pressure; and means communicating with the pressure fluid source and operative in response to the reference pressure to develop therefrom a pressure reflecting driver demand for controlling the ratio changing mechanism.

9. In a control system for an engine driven transmission having ratio changing mechanism for varying the drive through the transmission; the combination of movable means responsive to driver demand on the engine; a pressure fluid source; means developing a reference fluid pressure corresponding to the position of the movable means; the developing means including an electrically operated valve communicating with the source and operative to develop the reference fluid pressure, an energizing circuit for operating the valve, the energizing circuit including an electric power source and a switching device operative to connect the valve to the electric power source, means sensing the position of the movable means for operating the switching device, the sensing means being arranged so as to be mechanically associated with the movable means and also fluid pressure responsive feedback means supplying the reference pressure to the sensing means so as to advise the sensing means of the reference fluid pressure being developed; and pressure regulating means communicating with the pressure fluid from the source and operative in response to the reference pressure to develop therefrom a pressure reflecting driver demand for controlling the ratio changing mechanism.

10. In a control system for an engine driven transmission having ratio changing mechanism for varying the drive through the transmission; the combination of a manually movable control for the engine, a pressure fluid source; means developing a reference fluid pressure corresponding to the position of the manually movable control; the developing means including an electrically operated valve communicating with the source and operative to develop the reference fluid pressure, an energizing circuit for operating the valve, the energizing circuit including an electric power source and a switching device operative to connect the valve to the power source, means sensing the position of the manually movable controller for operating the switching device, the sensing means including a cam surface associated with the manually movable controller so as to have corresponding movements and a switch actuated by the cam surface for operating the switching device, and feedback means supplying the reference pressure to the switch so as to render the switch also responsive to the reference fluid pressure; and pressure regulating means communicating with the pressure fluid source and operative in response to the reference pressure to develop therefrom a pressure reflecting driver demand for controlling the ratio changing mechanism.

11. In a control system for a throttle controlled engine driven transmission having a ratio changing mechanism for varying the drive through the transmission; the combination of a pressure fluid source; means developing a reference fluid pressure corresponding to the position of the throttle; the developing means including an electrically operated valve communicating with the source and operative to develop the reference fluid pressure; an energizing circuit for operating the valve, the energizing circuit including an electric power source and a switching transistor having emitter and collector electrodes so arranged as to interconnect the electric power source and the valve and a control electrode, means sensing throttle position for operating the transistor, the sensing means including a cam surface associated with the throttle so as to have corresponding movements and a pressure switch actuated by the cam surface, the pressure switch being adapted to cause a bias potential to be applied to the transistor control electrode for rendering the transistor operative, and feedback means supplying the reference pressure to the pressure switch so as to render the pressure switch also responsive to the reference pressure; and pressure regulating means communicating with the pressure fluid source and operative in response to the reference pressure to develop therefrom a pressure reflecting throttle position for controlling the ratio changing mechanism.

References Cited
UNITED STATES PATENTS

| | | | |
|---|---|---|---|
| 2,875,634 | 3/1959 | Gelenius et al. | 74—472 |
| 3,043,161 | 7/1962 | Tuck | 74—472 |
| 3,085,556 | 4/1963 | Peczkowski | 137—85 |

DONLEY J. STOCKING, *Primary Examiner.*

DAVID J. WILLIAMOWSKY, *Examiner.*

J. R. BENEFIEL, *Assistant Examiner.*